(12) United States Patent
Emberling et al.

(10) Patent No.: US 11,362,518 B2
(45) Date of Patent: Jun. 14, 2022

(54) ELECTRICAL SYSTEM FOR PROVIDING ELECTRICITY

(71) Applicant: E A Solar, LLC, Hallandale Beach, FL (US)

(72) Inventors: Dennis Emberling, Brentwood, TN (US); David Shimon, Aventura, FL (US)

( * ) Notice: Subject to any disclaimer, the term of this patent is extended or adjusted under 35 U.S.C. 154(b) by 33 days.

(21) Appl. No.: 16/947,612

(22) Filed: Aug. 10, 2020

(65) Prior Publication Data
US 2022/0045514 A1   Feb. 10, 2022

(51) Int. Cl.
*H02J 3/38* (2006.01)
*G05B 19/042* (2006.01)

(52) U.S. Cl.
CPC .......... *H02J 3/381* (2013.01); *G05B 19/042* (2013.01); *G05B 2219/2639* (2013.01); *H02J 2300/22* (2020.01)

(58) Field of Classification Search
CPC .... H02J 3/381; H02J 2300/22; G05B 19/042; G05B 2219/2639
See application file for complete search history.

(56) References Cited

U.S. PATENT DOCUMENTS

| | | | | |
|---|---|---|---|---|
| 6,031,749 A | * | 2/2000 | Covington | H02M 7/2176 363/98 |
| 2009/0224681 A1 | * | 9/2009 | Bassford | H05B 47/105 315/176 |
| 2012/0187106 A1 | * | 7/2012 | Ashkenazy | H02J 3/381 219/438 |
| 2013/0257372 A1 | * | 10/2013 | Chen | H02J 13/00034 320/109 |
| 2014/0188583 A1 | * | 7/2014 | Thatcher | G06Q 50/06 705/14.11 |
| 2016/0118846 A1 | * | 4/2016 | Huang | H02S 40/30 320/101 |

(Continued)

OTHER PUBLICATIONS

"Solar is Good. Solar Microgrids are Better" https://microgridknowledge.com/solar-microgrids-are-better/, Aug. 8, 2016.

(Continued)

*Primary Examiner* — Thomas C Lee
*Assistant Examiner* — Charles Cai

(57) ABSTRACT

In one embodiment, a first electrical network includes one or more first electricity producing elements, and a first conductive path electrically couples at least some of those elements to an end user's electrical wiring, which is coupled by a second conductive path to one or more second electricity producing elements of a public utility electrical network. A switch coupled between the first conductive path and the end user's electrical wiring and between the second conductive path and the end user's electrical wiring electrically isolates the first electrical network from the public utility electrical network. Based on a determination of whether an amount of electricity used by the end user exceeds an amount of electricity the first electrical network is capable of providing to the end user, the switch either draws electricity only from the first electrical network or from both the first electrical network and the public utility electrical network.

30 Claims, 6 Drawing Sheets

(56) References Cited

U.S. PATENT DOCUMENTS

2018/0366978 A1\* 12/2018 Matan .................. H02J 3/16

OTHER PUBLICATIONS

"Bringing Stability to War-Torn Somalia with Solar Microgrids" https://microgridknowledge.com/solar-microgrids-somalia-solargen/, Apr. 13, 2018.
"Solar Microgrids for National Security: Study Finds 17 GW Could Fortify US Military Bases" https://microgridknowledge.com/solar-microgrids-for-national-security/, May 9, 2017.
"Will Utilities Look at Solar Microgrids in the Rearview Mirror and Say "Uh Oh""https://microgridknowledge.com/utilities-look-at-solar-microgrids-and-say-uh-oh/, Nov. 16, 2015.
"Santa Barbara, California Seeks Bids for at Least Six School Microgrids, Solar and Storage" https://microgridknowledge.com/school-microgrids-santa-barbara/, May 21, 2020.
"Solar Advocates See Opportunity to Take Microgrids to the Next Level in California" https://microgridknowledge.com/solar-plus-storage-microgrids-california/, Feb. 20, 2020.
"Study Finds Large Potential for Solar and Community Microgrids in San Diego" https://microgridknowledge.com/community-microgrids-solar-san-diego/, Jan. 15, 2019.
"Making Microgrids as Simple to Deploy & Finance as Rooftop Solar" https://microgridknowledge.com/scale-microgrid-solutions/, Nov. 26, 2018.
"A Surprise to Analysts: Less CHP in Microgrids, More Solar" https://microgridknowledge.com/chp-microgrids-icf-database/, Oct. 18, 2018.
"Solar-Storage Microgrids Poised to Surge Amid Philippines' Rural Electrification Drive" https://microgridknowledge.com/philippines-microgrid-market/, Sep. 17, 2018.
"Colorado Energy Storage Rights Bill Could Boost Solar Plus Storage Microgrids" https://microgridknowledge.com/energy-storage-right-bill-colorado/, Mar. 28, 2018.
"Solar Plus Storage Microgrids Bring Relief to Puerto Rico—and Hint of the Future" https://microgridknowledge.com/solar-plus-storage-microgrids-puerto-rico/, Feb. 27, 2018.
"How Will the Solar Tariff Affect Microgrids?" https://microgridknowledge.com/will-solar-tariff-affect-microgrids/, Feb. 26, 2018.
"Are Cryptocurrency Miners a New Market for Solar Plus Storage Microgrids?" https://microgridknowledge.com/solar-plus-storage-microgrid-cryptocurrency/, Feb. 1, 2018.
"The Potential of DC-Coupled Solar Plus Storage Microgrids" https://microgridknowledge.com/solar-plus-storage-microgrids/, Sep. 4, 2017.
"Navigant Identifies 173 More Microgrid Projects, Sees Growth in Solar & CHP Microgrids"https://microgridknowledge.com/microgrid-projects-navigant-2q-2017/, Jun. 20, 2017.
"Solar Plus Storage Microgrids Show Strong Promise"https://microgridknowledge.com/solar-plus-storage-microgrids-dynapower/, May 12, 2017.
"Preparing for Emergencies with Wind, Solar, Energy Storage and Microgrids"https://microgridknowledge.com/energy-storage-and-microgrids-rap/, Mar. 6, 2017.
"Solar Plus Storage Microgrids Not a Fad: Navigant" https://microgridknowledge.com/solar-plus-storage-microgrids-navigant/, Jan. 5, 2017.
"Solar Powered Microgrids on Small Islands" https://microgridknowledge.com/white-paper/solar-powered-microgrids-on-small-islands/, Dec. 2015.
"New York Interconnection Applications Up; Process Eased for Microgrids, Solar" https://microgridknowledge.com/new-york-interconnection-applications/, Mar. 28, 2016.
"Four Ontario Communities Win $5M for Solar-powered Microgrids" https://microgridknowledge.com/solar-powered-microgrids/, Mar. 23, 2016.
"Australian Group Studies How Neighborhood Microgrids Can Boost Solar Use" https://microgridknowledge.com/australian-group-studies-how-neighborhood-microgrids-can-boost-solar-use/, Nov. 26, 2015.
"New York Encourages Pairing of Community Microgrids and Community Solar" https://microgridknowledge.com/new-york-encourages-pairing-of-community-microgrids-and-community-solar/, Oct. 14, 2015.
"Quick Microgrid News Double Look at Microgrids for DC Solar Goes Roofless in NY Redox Flow Battery to Serve Ontario Grid" https://microgridknowledge.com/quick-microgrid-news-double-look-at-microgrids-for-dc-solar-goes-roofless-in-ny-redox-flow-battery-to-serve-ontario-grid/, Aug. 20, 2015.
"The Triple Threat: Community Choice, Microgrids and Community Solar" https://microgridknowledge.com/triple-threat-community-choice-microgrids-and-community-solar/, Aug. 8, 2015.
"What are microgrids and how do they work?" https://news.energysage.com/what-are-microgrids/, Jan. 17, 2019.
"Are Solar Microgrids the Future in the Developing World?" https://energyathaas.wordpress.com/2018/10/01/are-solar-microgrids-the-future-in-the-developing-world/, Oct. 1, 2018.
"What Are Microgrids?" https://www.umasolar.com/blog/microgrids/, Sep. 2018.
"How do Solar Microgrids Work?" https://www.performanceservices.com/resources/solar-microgrids, Jun. 1, 2017.
"REC Solar, DHX Complete Solar Microgrid Project" https://solarindustrymag.com/rec-solar-dhx-dependable-hawaiian-complete-solar-microgrid-project, May 7, 2020.
"Climate change impact of integrating a solar microgrid system into the Swedish electricity grid" https://www.sciencedirect.com/science/article/pii/S0306261920304931, Jun. 15, 2020.
"Solar Microgrid Design & Engineering" https://www.sepisolar.com/solar-design-services/solar-microgrids/, Dec. 2018.
"Arlington Microgrid Project" https://www.snopud.com/?p=3326, Apr. 2020.
"Direct Relief solar microgrid case study" https://energycentral.com/c/gr/direct-relief-solar-microgrid-case-study, May 24, 2020.
"Solar, Microgrid & EV Energy Consulting" https://www.burnsmcd.com/projects/solar-microgrid-ev-energy-consulting, Jul. 2020.
"Future gas-solar microgrid lifting Pittsburgh airport into energy independence" www.power-eng.com/2020/07/22/future-gas-solar-microgrid-lifting-pittsburgh-airport-into-energy-independence/, Jul. 22, 2020.
"Building on hydro's strengths to integrate solar, microgrid into a portfolio" www.renewableenergyworld.com/2019/11/20/building-on-hydros-strengths-to-integrate-solar-microgrid-into-a-portfolio, Nov. 20, 2019.
"7 companies making their mark with commercial microgrids" https://www.greenbiz.com/article/7-companies-making-their-mark-commercial-microgrids, Dec. 31, 2019.
"Clean Coalition helps Santa Barbara Unified School District start massive solar microgrid initiative" https://www.solarpowerworldonline.com/2019/12/clean-coalition-santa-barbara-unified-school-district-solar-microgrids/, Dec. 18, 2019.
"Coronavirus Slows US Microgrid Market Despite Growing Need for Resilience" www.greentechmedia.com/articles/read/coronavirus-will-have-short-and-long-term-impacts-on-u.s-microgrid-market, Jul. 28, 2020.
"Understanding Micro Grids" https://medium.com/solar-microgrid/understanding-microgrids-abff68d44485, May 22, 2016.
"Solar Microgrid Facts You Should Know" https://solarpoweredblog.com/solar-microgrid-facts-you-should-know/, Jul. 2019.
"Microgrids could be the next big thing" synergy.net.au/Our-energy/Blog/2018/02/They-sound-tiny-but-microgrids-could-be-the-next-big-thing-in-Australia, Feb. 2018.
"The Benefits of Solar Microgrids" https://www.ysgsolar.com/blog/benefits-solar-microgrids-ysg-solar, Apr. 9, 2019.
"Urban Microgrids: The Potential for Urban Energy Generation and Efficiency" https://www.theurbanist.org/2020/06/26/urban-microgrids-the-potential-for-urban-energy-generation-and-efficiency/, Jun. 26, 2020.
"Solar Microgrid" http://energy-conscious.net/solar-microgrid/, Jul. 2020.

(56) References Cited

OTHER PUBLICATIONS

"What is a solar microgrid and how does it work?" https://www.solarmarket.com.au/blog/what-is-a-solar-microgrid-and-how-does-it-work/, Jan. 14, 2020.
"Meet the microgrid, the technology poised to transform electricity" www.vox.com/energy-and-environment/2017/12/15/16714146/greener-more-reliable-more-resilient-grid-microgrids, May 24, 2018.
"Creating and Maintaining a Microgrid: Tools to Get You from Concept to Reality to O&M" renewableenergyworld.com/2018/02/08/creating-and-maintaining-a-microgrid-tools-to-get-you-from-concept-to-reality-to-o-m/, Feb. 8, 2018.
"Three Phases in Designing Successful Microgrid Projects" https://microgridnews.com/three-phases-in-designing-successful-microgrid-projects/, Aug. 6, 2018.
"Community Microgrids" https://www.distributedenergy.com/microgrids/article/21113795/community-microgrids, Nov. 18, 2019.
"Sustainable microgrids are the future of clean energy" https://techcrunch.com/2020/03/04/sustainable-microgrids-are-the-future-of-clean-energy/, Mar. 4, 2020.
"Microgrids" https://schatzcenter.org/microgrids/, Jul. 2020.
"Off-Grid Microgrid: Solar + Batteries + Thermal Generation" https://www.powermag.com/off-grid-microgrid-solar-batteries-thermal-generation/, Mar. 31, 2019.
"Microgrid-Ready Solar PV—Planning for Resiliency" https://www.nrel.gov/docs/fy18osti/70122.pdf, Sep. 2017.
"Solar Energy as a Social Enterprise" https://communityactionpartnership.com/wp-content/uploads/2019/09/Cap-Solar-Chigcago-Presentation.pdf, Aug. 2019.
"Community Solar Policy Decision Matrix" CCSA-Community Solar Policy-Decision-Matrix-11-15-2016.pdf, Nov. 15, 2016.
"Transition Faster Together: Setting the scene" https://www.dnvgl.com/publications/transition-faster-together-setting-the-scene-176549, Jun. 8, 2020.
"The Solarize Guidebook: A community guide to collective purchasing of residential PV systems" https://www.nrel.gov/docs/fy12osti/54738.pdf, May 2012.
"The Vision for U.S. Community Solar: A Roadmap for 2030" https://votesolar.org/policy/policy-guides/shared-renewables-policy/csvisionstudy/, Jul. 2018.
"Community Solar Basics" https://irecusa.org/publications/community-solar-basics/, Nov. 2017.
"State Shared Renewable Energy Program Catalog Overview" https://irecusa.org/wp-content/uploads/2018/06/State-Shared-Renewables-Catalog-Overview_FINAL_120716.pdf, Dec. 2016.
"Community Solar 101" https://www.nrel.gov/docs/fy20osti/75982.pdf, Feb. 24, 2020.
"Focusing the Sun: State Considerations for Designing Community Solar Policy" https://www.nrel.gov/docs/fy18osti/70663.pdf, Jan. 2018.
"A Guide to Community Shared Solar: Utility, Private, and Nonprot Project Development" https://www.nrel.gov/docs/fy12osti/54570.pdf, May 2012.
"Shared Solar: Current Landscape, Market Potential, and the Impact of Federal Securities Regulation" https://www.nrel.gov/docs/fy15osti/63892.pdf, Apr. 2015.
"Status and Trends in the Voluntary Market (2018 data)" https://www.nrel.gov/docs/fy20osti/74862.pdf, Sep. 2019
"Up to the Challenge: Communities Deploy Solar in Underserved Markets" https://www.nrel.gov/docs/fy19osti/72575.pdf, May 2019.
"The Ecology of Community Solar Gardening: A 'Companion Planting' Guide" https://pubs.naruc.org/pub/FA85C744-AB5F-C165-8DF0-C82D0DB5DA09, Aug. 2016.
"Solar in the Southeast" https://cleanenergy.org/wp-content/uploads/2018-SE-Solar-Report-FINAL.pdf, Jan. 2019.
"Solar in the Southeast Annual Report Jun. 23, 2020" https://cleanenergy.org/wp-content/uploads/Solar-in-the-Southeast-Report-2020.pdf, Jun. 23, 2020.
"2020 Sustainable Energy in America Factbook" https://bcse.org/factbook/, Feb. 13, 2020.
"DC Microgrids Scoping Study—Estimate of Technical and Economic Benefits" https://www.energy.gov/sites/prod/files/2015/03/f20/DC_Microgrid_Scoping_Study_LosAlamos-Mar2015.pdf, Mar. 2015.
"Making microgrids work: Practical and technical considerations to advance power resiliency" https://www.eaton.com/content/dam/eaton/services/eess/eess-documents/making-microgrids-work-wp027009en.pdf, Jul. 2017.
"The Advanced Microgrid Integration and Interoperability" https://www.energy.gov/sites/prod/files/2014/12/f19/AdvancedMicrogrid_Integration-Interoperability_March2014.pdf, Mar. 2014.
"Microgrid Implementation Challenges and Key Technologies" https://download.schneider-electric.com/files?p_Doc_Ref=998-2095-09-29-17AR0_EN, Jan. 2017.
"Value streams in microgrids: a literature review" https://www.sciencedirect.com/science/article/abs/pii/S0306261915013082, Jan. 15, 2016.
"Navigating Local Utility Requirements for Microgrids: Lessons from New York" https://info.veolianorthamerica.com/hubfs/offers/white-papers/mc/navigating-local-utility-requirements-for-microgrids-white-paper.pdf, May 2018.

* cited by examiner

ELECTRICAL SYSTEM FOR PROVIDING ELECTRICITY

TECHNICAL FIELD

This disclosure generally relates to systems and networks for generating and distributing electricity.

BACKGROUND

Electrical circuits use current to transfer electrical energy between a power generator and a load, which uses the electrical energy. Conventional power grids, commonly in the form operated by a public utility, provide electrical energy to end users, such as business and residences. The source of the generator's power is commonly is a fossil fuel, such as coal or natural gas; a nuclear source; or a renewable source, such as solar, wind, or hydropower. Public utility grids use conventional circuit technology, such as transformers, for transmitting and distributing electrical energy to end users at varying voltages. Typically, in the United States electrical energy is delivered to end users at 240 volts to power various electrical loads at the end user, through an interface such as the conventional two-or-three-pronged electrical outlet.

DESCRIPTION OF EXAMPLE EMBODIMENTS

Figure 1:
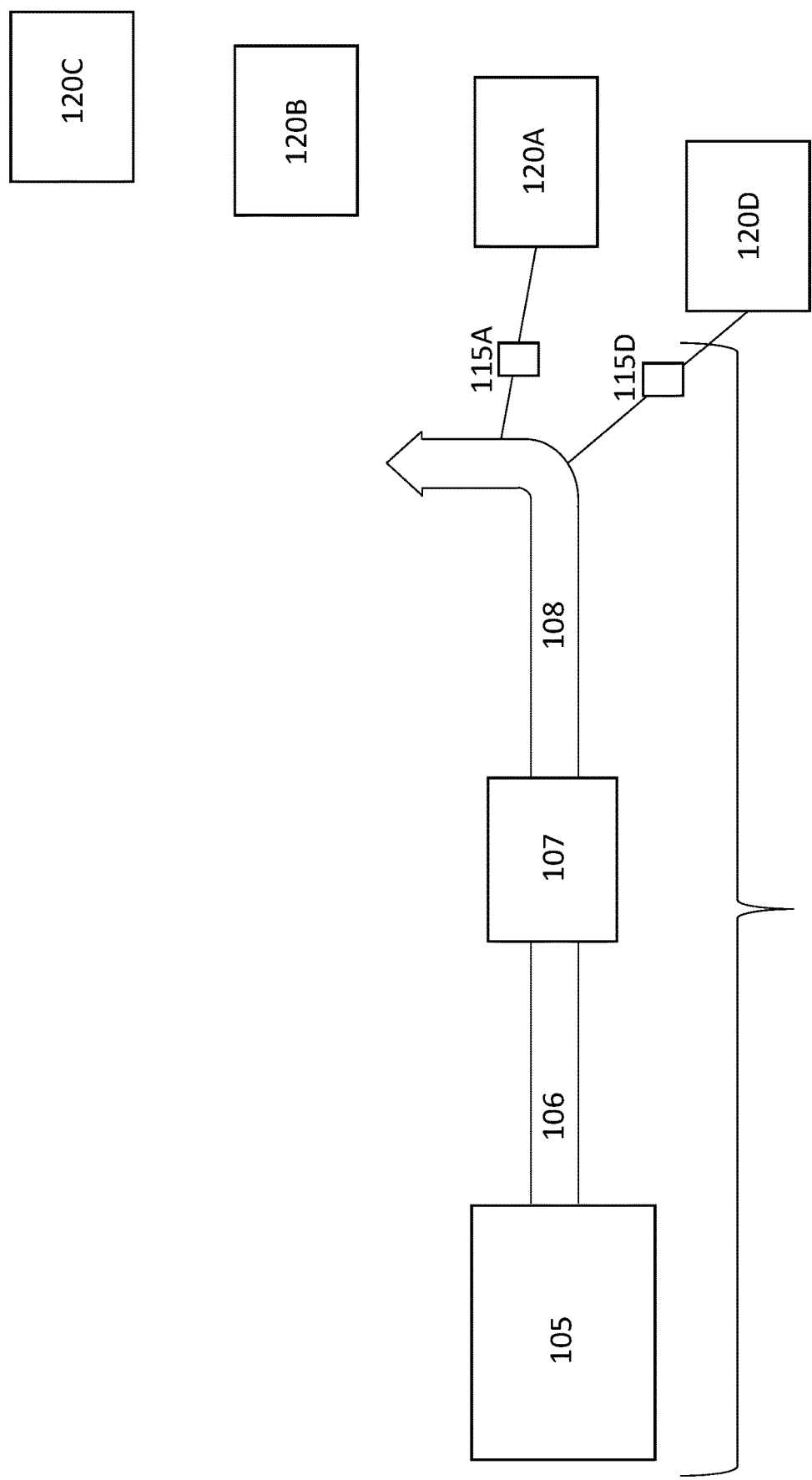
FIG. 1 illustrates an example system for providing electricity from a public utility.

FIG. 1 illustrates an example system 100 for providing electricity from a public utility. System 100 is referred to herein as a "public-utility system," although as explained below, not every component of system 100 is necessarily owned by a public utility. Generation facilities 105 generate electricity for usage by end users, such as end users 120A-D. End users can be private or public facilities, such as residences, business, libraries, courthouses, hospitals, educational (e.g., college) campuses, municipal facilities (such as a wastewater treatment plant), etc. Generation facilities 105 can include facilities for generating electricity, such as the facilities associated with a hydrological dam or facilities associated with a coal-fired power plant. Generation facilities 105 can also include energy storage facilities, which may be separate from or a part of the facilities for generating electricity. For example, energy storage facilities can include batteries or pumped-water storage facilities.

Public-utility system 100 for providing electricity from a public utility includes transmission network 106, substation 107, and distribution lines 108. Transmission network 106, substation 107, and distribution lines 108 include the physical wiring and electrical elements, such as transformers, for delivering electricity from public-utility system 100 to end users. For example, transmission network 106 can include high-voltage transmission elements that transmit wired electrical energy at high voltage such as, for example, 60 kV to 500 kV. A High-voltage transmission network may be used for transmitting electrical energy across relatively long distances. Substation 107 converts high-voltage electrical energy received from transmission network 106 to a lower voltage, and distribution lines 108 distribute electrical energy from substation 107 to end users, such as end users 120A-D. Compared to high-voltage transmission network 106, distribution lines 108 carry electricity at relatively lower voltages, such as for example at or below 50 kV.

Public-utility system 100 for providing electricity from a public utility includes meters 115A and 115D upstream of end users 120A and 120D, respectively (the connection between end users 120B and 120C and public-utility system 100 and the meters associated with users 120B and 120C are present in public-utility system 100 but are not shown in FIG. 1). In this disclosure, the upstream direction is the direction away from the end user, while the downstream direction is the direction toward the end user. Meters measure the electrical energy from public-utility system 100 used by an end user, typically in the units of kWh. For example, meter 115A measures the electrical energy used by end user 120A from public-utility system 100. Meters are an important aspect of public-utility system 100 for providing electricity from a public utility, as the meter determines how the end user will compensate the public utility for the end user's use of electrical energy. In addition to the amount of electrical energy consumed, the public utility may charge different prices for a unit of electrical energy based on other aspects, such as the time of day during which the electrical energy is consumed or the peak demand for electrical energy from public-utility system 100.

Figure 2:
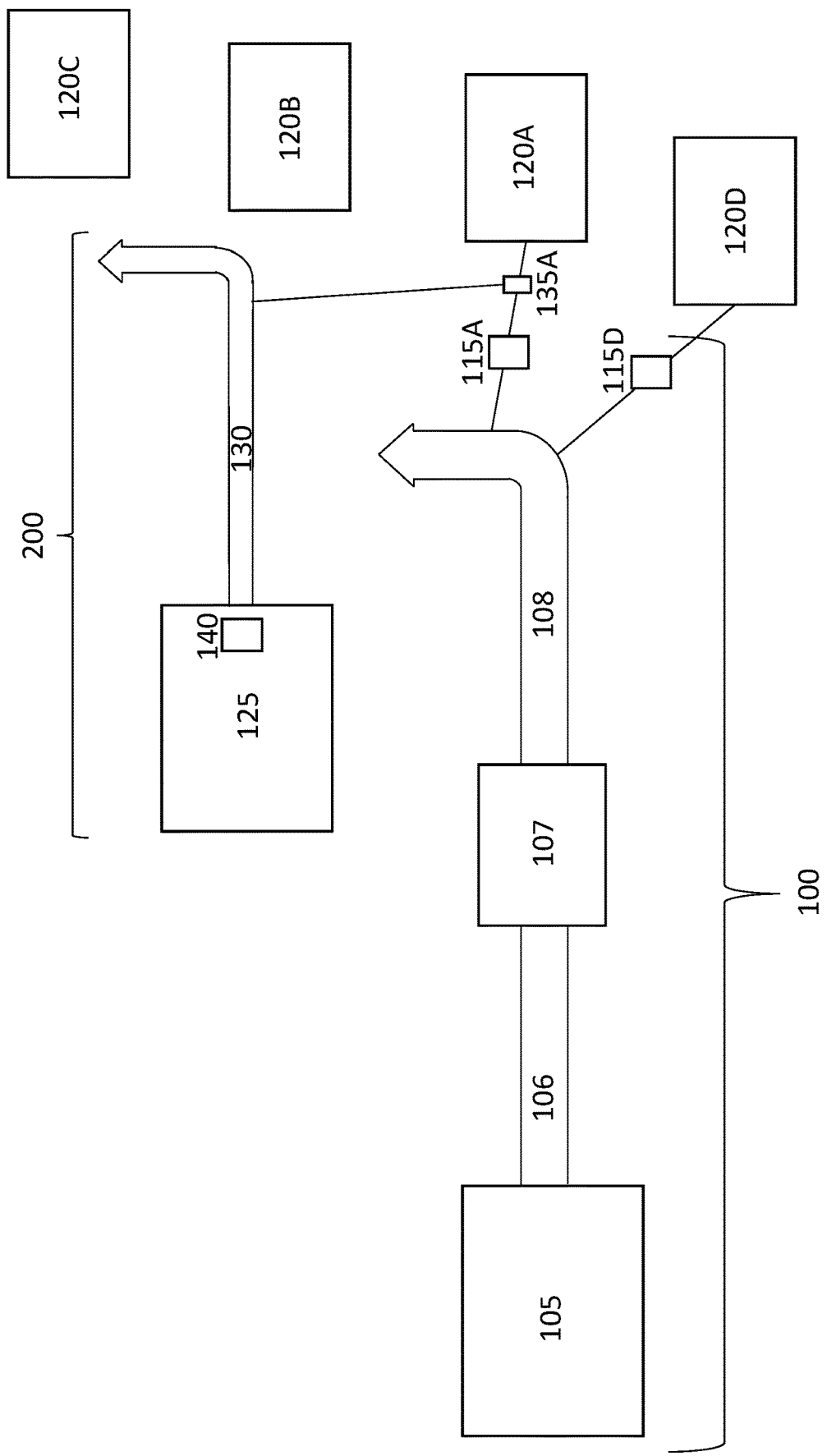
FIG. 2 illustrates an example system for directly providing electricity to an end user who is also connected to the public-utility system of FIG. 1.

FIG. 2 illustrates an example system 200 for directly providing electricity to an end user who is also connected to the public-utility system of FIG. 1. Particular embodiments of system 200 may be referred to as a "microgrid." As shown in FIG. 2, end user 120A is connected to both distribution lines 108 of the public-utility system 100 of FIG. 1 and also connected to distribution network 130 of the second electricity providing system 200. For example, system 200 is directly connected to end users 120A-C (the connection between system 200 and end users 120B-C is not shown in FIG. 2), bypassing and distinct from public utility system 100 to which end users 120A-C are also connected. More specifically, distribution network 130 of system 200 directly distributes electricity from generation facilities 125 of system 200 to end users 120A-C, such that none of the electricity provided by system 200 passes over public-utility system 100. As shown in FIG. 2., generation facilities 125 and distribution network 130 is electrically isolated from every part of public-utility system 100.

Generation facilities 125 of system 200 generate the electricity provided to end users 120A-C. In particular embodiments, generation facilities 125 include facilities for converting solar energy to electrical energy, such as by using an array of solar panels, as described more fully in connection with FIG. 3. Generation facilities 125 may also include alternative or backup components for providing electricity to end users 120A-C. For example, generation facilities 125 may include batteries that provide electricity to end users 120A-C if the power demands of end users 120A-C exceed the power that network 200 can provide from solar energy. In this example, electricity is provided to end users 120A-C using electrical energy derived from solar energy captured by generation facilities 125, such that electricity is provided from backup or alternative power sources only if the electrical energy capable of being provided by generation facilities 125 derived from solar energy is not sufficient to meet the needs of end users 120A-C.

While the example above describes energy demands of end users 120A-C, this disclosure contemplates that energy demands may be evaluated on a subset of end users 120A-C, for example on an individual end-user-by-end-user basis. For example, as described more fully herein, end user 120A may have an associated subset of electrical resources in generation facilities 125, which may include a subset of resources for supplying electricity from solar energy. Backup batteries of generation facilities 125 may be used to supply electricity to end user 120A when user 120A's power demands exceed the electrical power that can be supplied by the associated subset of resources from generation facilities 125 for supplying electricity from solar energy, even if the total resources of generation facilities 125 for supplying electricity from solar energy may not be exceed by the total demand of all end users 120A-C. In particular embodiments, multiple end users may share a subset of electrical resources in generation facilities 125, and power demands may be met on that basis. In particular embodiments, all end-users of a particular system 200 may share all of the electrical resources in electricity generation facilities 125, and power demands may be met on an aggregate basis.

As shown in FIG. 2, electricity from generation facilities 125 is provided to end user 120A over distribution network 130, which provides a direct electrical connection between end user 120A and generation facilities 125. In particular embodiments, and in contrast to public-utility system 100, distribution network 130 distributes electrical energy to end users using only relatively low voltage, such as, e.g., 480V, for example as appropriate for the relatively short distance of distribution network 130 to the end user. Such distances may be, for example, up to a mile and half of wiring between generation facilities 125 and an end user, although end users may also be substantially closer to generation facilities 125, thereby reducing the length of distribution network 130 to that end user. In contrast, even distribution lines 108 of public-utility system 100 may be substantially longer than distribution network 130, and the path over which public-utility system 100 provides electricity from generation facilities 105 to end users includes transmission network 106, which as explained above transmits electricity at much higher voltages than is used by the system 200's path for distributing electricity from generation facilities 125 to end users. Indeed, as shown in FIG. 2, system 200 does not include any transmission network. Moreover, as shown in FIG. 2, system 200 does not include distribution facilities 107 separate from generation facilities 105; instead, generation facilities 125 include the distribution components of system 200.

In preferred embodiments, distribution network 130 of system 200 uses below-ground wiring, increasing the reliability (relative to above-ground wiring) of system 200's ability to provide uninterrupted electricity. End users 120A-C served by system 200 are typically clustered relatively close to each other and to generation facilities 125 of system 200, relative to the distances between end users serviced by public-utility system 100 and between end users and generation facilities 105 of public-utility system 100, respectively. As illustrated in FIG. 2, not every (or in particular embodiments, not even most) end users 120 serviced by public-utility system 100 are also serviced by system 200. For example, end user 120D is connected to public-utility system 100 but is not connected to system 200. Thus, in particular embodiments system 200 provides a direct connection to a subset of multiple end users relatively close to each other who are also a subset of end users served by public-utility system 100.

Distribution network 130 connects to end user 120A's electrical wiring via switch 135A, which is described more fully herein. Because end user 120A connects to two separate and distinct electrical networks (i.e., public-utility system 100 and also to system 200), switch 135A determines and selects which electrical system to use to supply electricity to end user 120A at any given time. System 200 is electrically isolated from public-utility system 100, and in particular embodiments, Switch 135A electrically isolates public-utility system 100 from system 200. Upstream of a switch may be the end user's wiring leading separately to wiring of systems 100 and 200, respectively, or the switch may interface between the end user's wiring and the wiring of public-utility system 100 or system 200, or both. For example, at least some of the wiring upstream of switch 135A leading to distribution network 130 may be part of end user 120A's network or may be owned by the operator of system 200. Likewise, at least some of the wiring upstream of switch 135A leading to distribution lines 108 may be part of end user 120A's network or may be owned by the owner of public-utility system 100.

As explained more fully herein, in preferred embodiments system 200 is not merely a backup or supplement to public-utility system 100 to meet end users' electricity needs. Rather, in particular embodiments system 200 directly provides the majority—and even a substantial majority, such as at least 90%—of the electrical energy consumed by one or more end users connected to system 200 over a given period of time, such as a month. Thus, in these embodiments, public-utility system 100 operates as a backup or supplement to the electrical consumption needs of, e.g., end user 120A. System 200 therefore neither mirrors public-utility system 100's configuration nor entirely replaces public-system 100, yet system 200 provides most of the electricity used by end user 120A. As explained above, system 200 may itself include backup power sources to provide an uninterrupted source of electrical power to connected end users, such as end user 120A.

As embodiments of system 200 provide uninterrupted electrical power, system 200 may particularly benefit end users who are sensitive to power outages, such as hospitals and other essential businesses, and heavy or commercial end users. In addition, system 200 may be less susceptible to power outages than public-utility system 100 because, for example, of the shorter distance between generation facilities 125 and end users 120A-C compared to the distance between generation facilities 105 and end users 120A-D, and because distribution network 130 of system 200 is below ground, unlike the above-ground wiring commonly associated with transmission network 106 and distribution lines 108 of public-utility system 100. Moreover, as explained more fully herein, system 200 can provide cleaner (e.g., solar) electricity to connected end users at reduced costs relative to electricity provided by public-utility system 100. In addition, as explained more fully in connection with FIG. 4, system 200 may provide higher-quality power relative to public-utility system 100 by more tightly controlling voltages and frequencies of the electricity distributed to an end user over distribution network 130, relative to electricity provided over public-utility system 100.

In particular embodiments, as illustrated in FIG. 2, there is no meter between system 200 and a connected end user's electrical wiring, such as the electrical wiring of end user 120A, while there is a meter (e.g., meters 115A and 115D) between the wiring of public-utility system 100 and the respective wiring of end users 120A-D. Thus, system 200 provides an unmetered, direct electrical connection to connected end users (e.g., end user 120A), without system 200 connecting to public-utility system 200. Alternatively, in particular embodiments there may be a meter between system 200 and an end user's wiring. For example, upstream of switch 135A toward distribution network 130, there may be a meter that, e.g., measures the electricity provided by system 200 to end user 120A.

Figure 3:
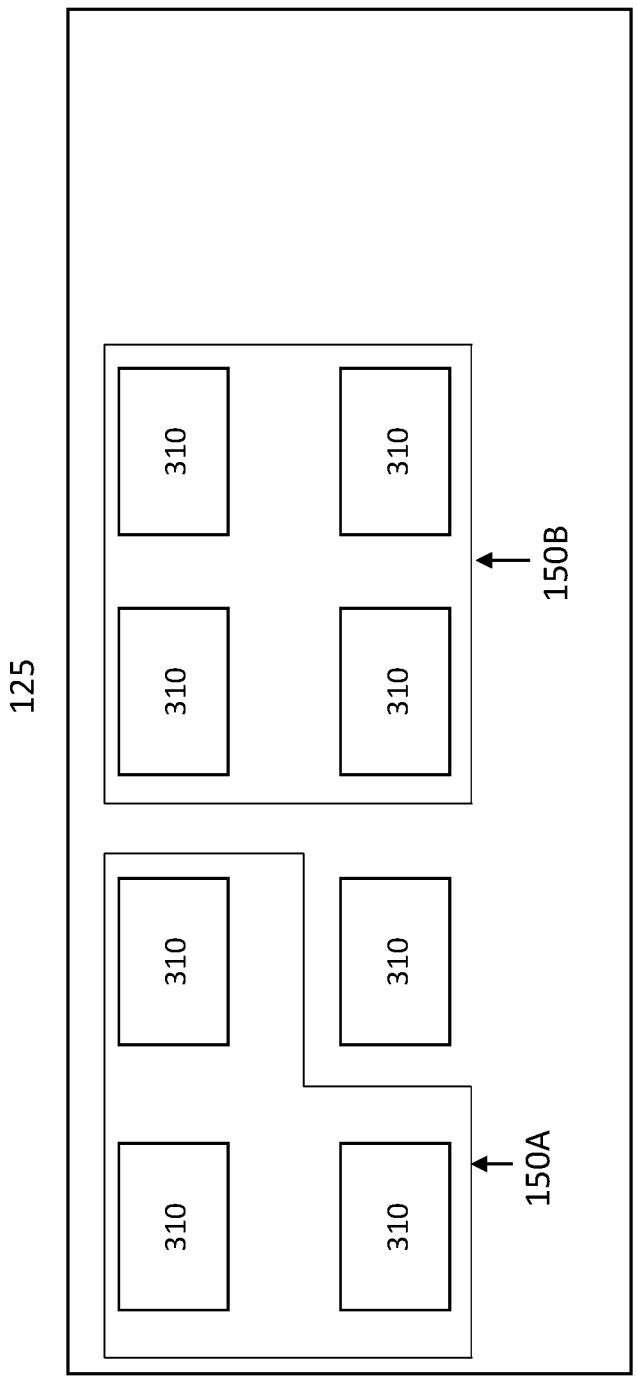
FIG. 3 illustrates an example of dedicating assets to provide electricity from the example system of FIG. 2 to an end user.

FIG. 3 illustrates an example of dedicating assets to provide electricity from the example system of FIG. 2 to an end user. In the example of FIG. 3, generation facilities 125 include an array of solar panels 310 for providing electricity to end users. As discussed above, this disclosure contemplates that the assets providing electricity to an end user may include units that store energy for transmitting electrical energy to end user.

In particular embodiments, end users may be assigned a set of assets for providing electricity. For example, and with reference to FIG. 2, end user 120A may be assigned a set 150A of solar panels 310 for generating electricity for end user 120A, while end user 120B may be assigned a set 150B of solar panels 310 for generating electricity for end user 120B. In particular embodiments, multiple end users may share a set of assets for providing electricity. For example, one or more users may share the set of solar panels 150A, with the electricity generated by those solar panels being dedicated to and shared by the one or more users assigned to those solar panels. In particular embodiments, the assets dedicated to a user or group of user may vary with time, for example based on the current, past, or projected future energy usage of the end user(s), or based on a predetermined amount (e.g., the end user(s) wish to change the amount of electrical assets dedicated to them).

As described above, e.g., with reference to FIG. 2, in particular embodiments the delivery of electricity to an end user from system 200 is unmetered. In these embodiments delivery of electricity from system 200 to the end user can be provided based on the dedicated assets assigned to that user. Thus, unlike the metered connection between public-utility system 100 and the end user (e.g., the metered connection including meter 115A between distribution lines 108 and end user 120A), end users can make unlimited use of dedicated assets from system 200 assigned to those respective end users. This can result in significant cost-savings benefits to the end user relative to the provision of electricity from public-utility system 100.

In particular embodiments, public-utility system 100, system 200, and the electrical networks of end users 120 are distinct systems, including in that they are developed, built, owned, operated, and maintained by different entities. For example, a public utility may own and operate transmission network 106, distribution facility 107, and distribution lines 108, while the end user owns, operates, and maintains the electrical facilities (e.g., wiring) within its own premises. System 200 may be owned and operated by a different entity than either the end user or the public utility that owns and operates at least part of public-utility system 100. As a result, provisioning of electricity from system 200 to end users may be entirely distinct from provisioning of electricity from public-utility system 100 to end users. For example, as illustrated in FIG. 2, public-utility system 100 may use a meter 115A to provide electricity to end user 120A, while system 200 may not use a meter to provide electricity to the same user, and may instead, for example and as described in connection with FIG. 3, dedicate a subset of electrical assets in generation facilities 125 to end user 120A. Thus, an end user may obtain electricity based on something other than a metered connection without having to provision, own, or operate its own generation and storage facilities or distribution facilities. The user may obtain alternatives to the provision of and arrangements made by the public utility owning and operating at least portions of public-utility system 100, again without having to provision its own separate electrical network.

In particular embodiments, the owner and operator of distribution network 130 of system 200 may be the same entity that owns and operates generation facilities 125 of system 200, in contrast to public-utility system 100 in which the public utility may own and operate transmission network 106, distribution facilities 107, and distribution lines 108 while a separate entity may own and operate generation facilities 105. This may benefit end users connected to systems 200. For example and as explained in connection with FIGS. 2 and 3, the end user may obtain electricity from system 200 through a dedicated set of assets of generation facilities 125 and may receive electricity from those dedicated assets over distribution network 130 without using a meter to determine the amount of electricity used. Particular embodiments of this arrangement may particularly benefit economically distressed communities, in which public-utility system 100 may hold a practical monopoly on the distribution of electricity (i.e., over distribution lines 108) to end users in the community. In addition, in particular embodiments and at least in-part because system 200 is electrically isolated from public-utility system 100, system 200 may avoid some or all of the governmental regulations imposed on public-utility system 100 and other networks that connect to public-utility system 100, and may be free from control by or requirements imposed by a public utility.

As explained in connection with FIG. 3, assets for providing electricity to an end user may be dedicated to a particular user or group of users, at least for a particular amount of time. Alternatively, electricity providing elements (such as, e.g., solar panels and storage batteries) of generation facilities 125 may be shared by all end users connected to system 200 and managed by a controller 140 of system 200. Particular embodiments of controller 140 may be a microgrid controller.

Figure 4:
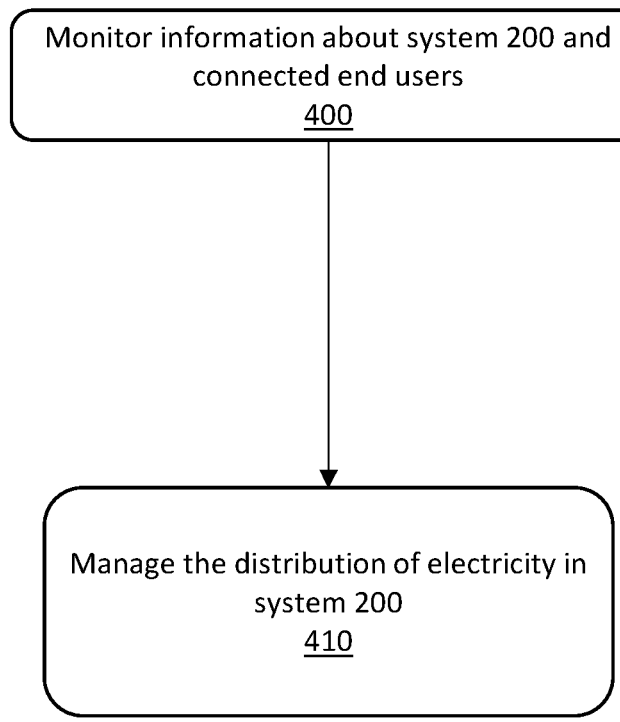
FIG. 4 illustrates example operations of a controller of the example system of FIG. 2.

Controller 140 includes hardware and software for managing the distribution of electricity from system 200 to connected end users, such as end users 120A-C. FIG. 4 illustrates an example method illustrating certain operations performed by controller 140. At step 400, controller 140 monitors the state of, and information about, system 200 and connected end users. For example, controller 140 may monitor information about electricity providing elements within generation facilities 125. For example, controller 140 may monitor solar panels, such as solar panels 150 illustrated in FIG. 3, for example on a panel-by-panel basis. Controller 140 may receive information about the amount of energy currently being generated by a panel, the amount of energy generated over a particular time period (e.g., a month), the lifetime use of the solar panel, etc. As another example, controller 140 may monitor the state of backup power sources, such as batteries, within generation facilities 125. For example, controller 140 may receive information about the current percent charge of a battery, the last charge time, the current draw on the battery, electrode status, etc. As explained more fully below, controller 140 may monitor this information to prioritize delivery of electricity to connected end users from system 200 over public-utility system 100 and, in particular embodiments, to charge one or more batteries.

As another example, controller 140 may monitor electricity demand on system 200 from connected end users, both on an individual end user basis and on an aggregate basis. For example, as shown in FIG. 2, end users 120A-C are each connected to system 200, and in particular embodiments, electronics at each end user's site prioritize drawing electricity from system 200 over drawing electricity from public-utility system 100. Thus, each end user 120A-C places a separate demand for electricity on system 200. Controller 140 monitors the individual and aggregate power demands on system 200, and in step 410, controller 140 controls the instantaneous, real-time distribution of electricity from system 200 to satisfy the demand of end users to the extent possible from generation facilities 125. Moreover, as explained below, controller 140 may also set specific requirements for the distribution of electricity, such as requirements limiting the amount frequency variance from 60 Hz or requirements limiting the amount of voltage variance from 480 volts. Moreover, system 200 may connect to only a few end users relative to public-utility system 100, and therefore generation facilities 125 of system 200 may not contain the large, rotating generators used by public-utility system 100. Such generators may have inertia that helps satisfy changes in electrical power demands from end users on public-utility system 100. Because particular embodiments of system 200 do not contain such generators, as explained below controller 140 in step 410 manages the distribution of electricity to end users directly from electricity-providing sources, such as solar panels and batteries, at generation facilities 125.

At step 410, controller 140 manages the distribution of electricity within system 200, for example by controlling the instantaneous, real-time distribution of electricity from system 200 to satisfy end-user demand. For example, direct current (DC) may be output from one or more solar panels or batteries, or both, within generation facilities 125. In particular embodiments, controller 140 may determine the appropriate source for the DC current generated by one or more solar panels. For example, when controller 140 determines that one or more batteries are not fully charged, controller 140 may direct some or all of a DC current from one or more solar panels to charge those one or more batteries, for example until a predetermined charge amount (e.g., a full charge) is met. As another example, when controller 140 determines that all batteries are fully charged or are charged to a predetermined amount, then controller 140 may direct some or all DC current output (after converting the current, as explained below) from one or more solar panels onto distribution network 130 to satisfy the electricity demands of connected end users. In particular embodiments, controller 140 may direct a certain portion of DC current from one or more solar panels to charge one or more batteries and may direct the other portion for use by connected end users.

As illustrated in FIG. 2, system 200 is directly connected to multiple end users, such as end users 120A-C, and is providing end users with full-time primary and uninterruptible emergency electricity. Electricity demands from these multiple users create dynamic and changing power requirements, placing varying loads on generation facilities 125. In step 410, controller 140 optimizes the distribution of electricity within system 200 and from the various components within system 200, based on the information received or accessed in step 400, to satisfy end-user demand. In particular embodiments, in step 410 controller 140 controls (i.e., specifies) the characteristics of alternating current (AC) output by generation facilities 125 to end users, for example by specifying the frequency and voltage at which the AC output by generation facilities 125 is distributed to connected end users (in particular embodiments, AC may be output by generation facilities 125 through the use of one or more inverters within those facilities to convert DC to AC). For example, controller 140 may tightly control the frequency of the voltage of AC distributed to connected end users to at or near 60 Hz. In addition, controller 140 may tightly control the voltage of AC distributed to connected end users to at or near, for example, 480 volts. Thus, in particular embodiments, controller 140 manages the direct distribution of electricity over distribution network 130 by specifying the characteristics (e.g., voltage, frequency) of AC sent to connected end users at each particular point in time. This is in contrast to public utility system 100, which may experience brownouts (i.e., the inability to deliver adequate electricity to meet a user's demands) and/or fluctuating frequency and voltage characteristics of the electricity delivered to an end user. Moreover, high-quality electricity is particular important to certain end users, such as commercial entities such as medical facilities, and controller 140 can ensure that such end users receive electricity with tightly controlled characteristics from system 200, which, as explained below, is prioritized for electricity delivery over public-utility system 100. In particular embodiments, controller 140 specifies the characteristics of electricity sent to end users by, for example, controlling the functionality of one or more regulators within generation facilities 125 that regulate the electricity distributed to connected end user.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4. Moreover, this disclosure contemplates that some or all of the operations of a controller, including the steps of the example method illustrated in FIG. 4, may be performed by circuitry of the controller, by a processor coupled to non-transitory computer readable storage media, or any suitable combination thereof.

Figure 5:
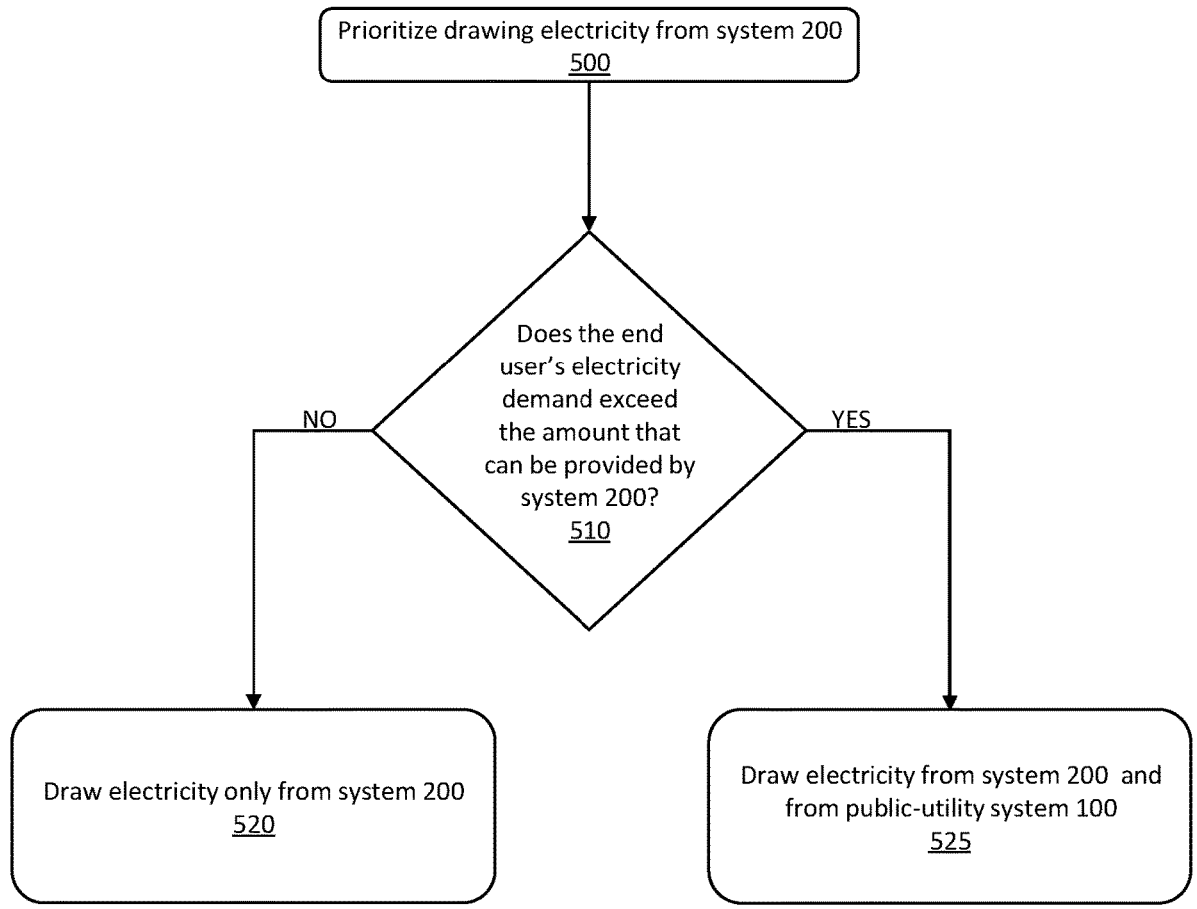
FIG. 5 illustrates example operations of an example switch illustrated in FIG. 2.

FIG. 5 illustrates an example method illustrating certain operations performed by an example embodiment of switch 135A interposed between at least part of end user 120A's electrical wiring, the electrical wiring leading to (or electrical wiring of) public-utility system 100, and the electrical wiring leading to (or electrical wiring of) system 200. Importantly, as shown in FIG. 2, switch 135A is downstream of meter 115A measuring the electricity drawn from public-utility system 100. For example, switch 135A may be located in or near a conventional main electrical box on end user 120A's premises. Switch 135A can create an open or closed circuit between the wiring of end user 120A and the wiring of system 200, such that, in the closed-circuit configuration, electricity is drawn from system 200 to supply end user 120A with electricity. Likewise, switch 135A can create an open or closed circuit between the wiring of end user 120A and the wiring of public-utility system 100, such that, in this closed-circuit configuration, electricity is drawn from system 100 to supply end user 120A with electricity. However, as explained more fully below, switch 135A always maintains an open circuit between public-utility system 100 and system 200 such that electricity from system 200 never flows onto public-utility system 100, such as through meter 115A onto distribution lines 108. Thus, as explained above, while system 200 directly connects to end user 120A's electrical network that also connects to public-utility system 100, system 200 is entirely electrically isolated from public-utility system 100. This disclosure contemplates that "open" and "closed" can refer to a physically open or closed circuit, respectively, or (in the case of an open circuit) a circuit that has or represents a high resistance such that current does not flow through the open circuit and (in the case of a closed circuit) a circuit that has or represents a low resistance such that current does flow through the closed circuit. For example, whether a circuit is open or closed may be determined by circuitry, such circuitry including logic gates, that prevents or allows current to meaningfully flow through the circuit when, for example, certain conditions are met.

As shown in FIG. 5, at step 500 switch 135A prioritizes drawing electricity from system 200 to satisfy the electricity needs of end user 120A. In other words, switch 135A creates a closed circuit between the system 200 and 120A's electrical wiring, and switch 135A creates an open circuit between public-utility system 100 and end user 120A's electrical wiring. At step 510, switch 135A determines whether end user 120A's electricity demand exceeds the electrical power that can be provided by system 200 to end user 120A. While this disclosure contemplates that step 510 may be performed by a real-time or near real-time analysis of end user 120A's electricity usage, this disclosure also contemplates that step 510 may be based at least in part on, for example, analysis of end user 120A's past or future electricity usage and/or on an analysis of system 200's past or future electrical power capabilities. Moreover, while in step 510 switch 135A determines whether end user 120A's electricity demand exceeds the electrical power that can be provided by system 200 to end user 120A, this disclosure contemplates that in particular embodiments such determination may be made at least in part or in whole by other components of system 200, such as controller 140, which may then provide suitable instructions to switch 135A based on the determination, as explained more fully below.

As step 520 illustrates, when system 200 is supplying or can supply sufficient electricity to meet end user 120A's electricity needs then switch 135A draws electricity only from system 200 to meet end user 120A's electricity needs, i.e., switch 135A maintains a closed circuit between system 200 and end user 120A's electrical wiring. If switch 135A has previously created a closed circuit between system 100 and end user 120A's electrical wiring, then at step 520 switch 135A creates an open circuit between system 100 and end user 120A's electrical wiring, such that end user 120A's electricity needs are satisfied by system 200. Method 500 then returns to step 510.

As step 525 illustrates, when system 200 cannot supply sufficient electricity to meet end user 120A's electricity needs then switch 135A draws electricity from both system 200 and from public-utility system 100 to meet end user 120A's electricity needs, i.e., switch 135A creates a closed circuit between public-utility system 100 and end user 120A's electrical wiring. Switch 135A then draws electricity from public-utility system 100 to end user 120A. In particular embodiments, Switch 135A may create an open circuit between end user 120A's electrical wiring and system 200, such that all of user 120A's electricity in step 525 is provided by public-utility system 100. Alternatively, as is shown in step 525, switch 135A may maintain a closed circuit between end user 120A's electrical wiring and system 200, such that end user 120A draws electricity from both public-utility system 100 and from system 200. Switch 135A may prioritize electricity drawn from system 200, for example by drawing all of the electricity available to end user 120A from system 200 and drawing from public-utility system 100 only the electricity necessary to make up the difference between what system 200 can provide and end user 120A's electricity demands. However, as explained above, in all cases switch 135A at all times strictly maintains electrical isolation between system 200 and public-utility system 100. Thus, in contrast to conventional switches such as automatic transfer switches, electricity from system 200 does not flow onto public-utility system 100, either directly from system 200 to public-utility system 100 or indirectly through the end user's wiring onto the wiring of public-utility system 100. As a result, while system 200 is given preference over public-utility system 100, system 200 also does not provide more electricity than is used or consumed by end user 120A. After step 525, the method of FIG. 5, returns to step 510.

While in the example method of FIG. 5 step 525 involves drawing some current from public-utility system 100 for end user 120A, this disclosure contemplates that other steps may additionally or alternatively be performed in response to a determination that system 200 cannot supply sufficient electricity to meet end user 120A's electricity needs. For example, in response to such a determination, system 200 in particular embodiments may dynamically allocate additional electricity providing assets (e.g., such as shown in FIG. 3) to end user 120A to increase the electricity provided by system 200 to end user 120A.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5. Moreover, this disclosure contemplates that some or all of the operations of a switch, including the steps of the example method illustrated in FIG. 5, may be performed by circuitry of the switch, by a processor coupled to non-transitory computer readable storage media, or any suitable combination thereof. Moreover, while this disclosure refers to certain operations as being performed by a switch, this disclosure contemplates that a collection of circuitry or software implemented in computer memory (or a combination of both) may perform these functions, regardless of whether such collection may disposed within a single component referred to as a switch.

As explained above, aspects of the systems and methods described herein may use one or more computer systems, such as a processor and storage media. The architecture of a computer system is well-know and is described, for example, in paragraphs 35-44 and FIG. 3 of U.S. Patent Application Publication No. 2015/0062178, portions of which are reproduced below and are incorporated by reference herein.

Figure 6:
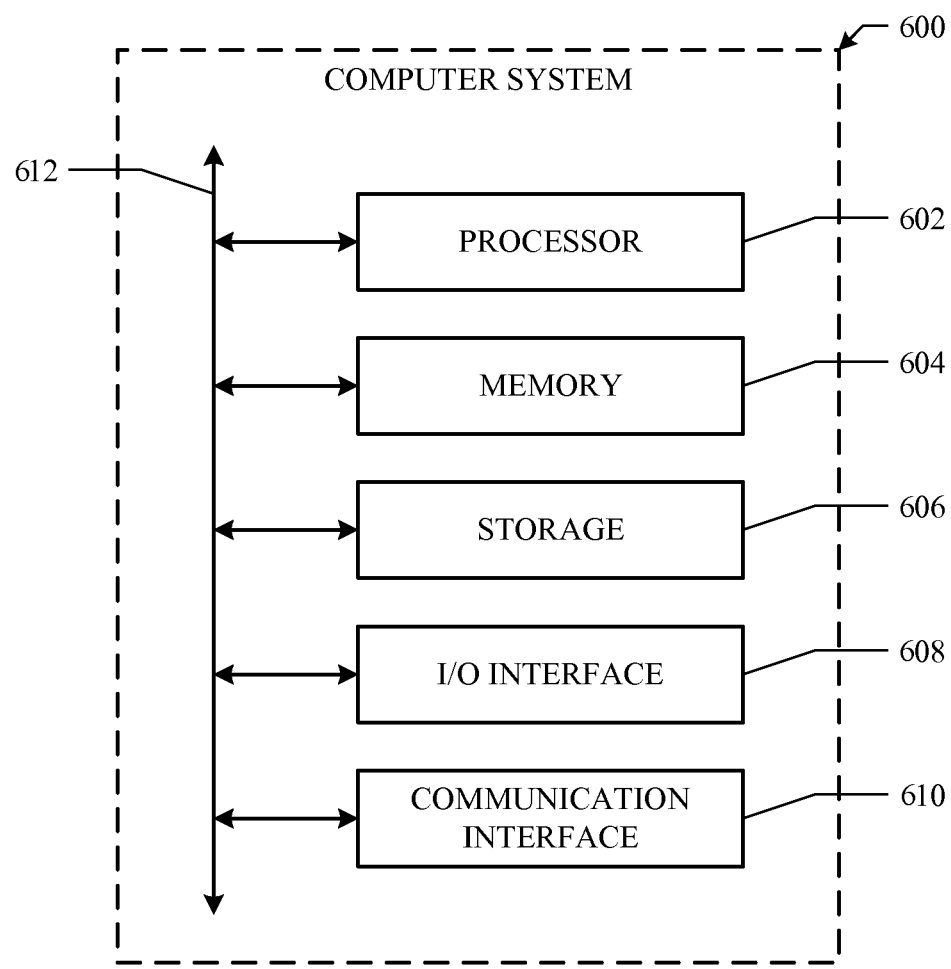
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A system comprising:
   one or more first electricity producing elements of a first electrical network;
   a first conductive path electrically coupling at least some of the first electricity producing elements to electrical wiring of an end user, wherein: the electrical wiring of the end user is coupled by a second conductive path to one or more second electricity producing elements of a public utility electrical network; and
   a switch coupled between the first conductive path and the electrical wiring of the end user and between the second conductive path and the electrical wiring of the end user, wherein the switch comprises circuitry configured to:
in response to a determination that the amount of electricity used by the end user does not exceed the amount of electricity the first electrical network is capable of providing to the end user, draw electricity to the end user only from first electrical network; and
in response to a determination that the amount of electricity used by the end user exceeds the amount of electricity the first electrical network is capable of providing to the end user, draw electricity to the end user from the first electrical network and from the public utility electrical network, wherein:
the switch at all times electrically isolates the first electrical network from the public utility electrical network and the end user is a first end user;
a third conductive path electrically coupling at least some of the first electricity producing elements to second electrical wiring of a second end user, and
a controller electrically coupled to the first electricity producing elements and to the first conductive path and the third conductive path, wherein the controller is configured to specify a voltage and a frequency of electricity delivered to the first end user and the second end user from the first electricity producing elements, wherein the specified frequency and voltage of the electricity delivered to the first end user is the same as the specified frequency and voltage of the electricity delivered to the second end user even when the first end user and the second end user place different loads on the first electricity producing elements.

2. The system of claim 1, wherein the controller is further configured to:
determine a first electricity demand by the first end user and a second electricity demand by the second end user;
allocate, based at least in part on the first demand, a first amount of electricity from the first electricity producing elements to the first end user; and
allocate, based at least in part on the second demand, a second amount of electricity from the first electricity producing elements to the second end user.

3. The system of claim 1, wherein the specified voltage is approximately 480 volts and the specified frequency is approximately 60 Hz.

4. The system of claim 1, wherein an electrical meter is coupled between the second conductive path and the electrical wiring of the first end user and no electrical meter is coupled between the first conductive path and the electrical wiring of the first end user.

5. The system of claim 1, wherein the one or more first electricity producing elements comprise one or more solar panels.

6. The system of claim 1, wherein the first electrical network further comprises one or more electrical storage elements electrically coupled to the first conductive path.

7. The system of claim 1, wherein the first electricity producing elements are capable of providing the majority of an amount of electricity used by the first end user and the second end user.

8. The system of claim 1, wherein:
the first electrical network is configured to transmit electrical current over the first conductive path using a voltage of not more than 480 volts; and
the public-utility electrical network is configured to transmit electrical current over at least part of the second conductive path using a voltage of at least 50 kilovolts.

9. The system of claim 1, wherein the first electrical network is operated by a first entity other than the first end user and the second end user, and the public utility electrical network is operated by a second entity other than the first entity and the first end user and the second end user.

10. The system of claim 9, wherein the second entity is a public utility.

11. A system comprising one or more processors and a non-transitory computer readable storage media embodying software coupled to the one or more processors, the one or more processors operable to execute the software to:
determine whether an amount of electricity used by an end user exceeds an amount of electricity a first electrical network is capable of providing to the end user, wherein the first electrical network comprises a first conductive path electrically coupling the first electrical network to electrical wiring of the end user, and the electrical wiring of the end user is also electrically coupled to a second conductive path of a public-utility electrical network;
in response to a determination that the amount of electricity used by the end user does not exceed the amount of electricity the first electrical network is capable of providing to the end user, draw electricity to the end user only from first electrical network; and
in response to a determination that the amount of electricity used by the end user exceeds the amount of electricity the first electrical network is capable of providing to the end user, draw electricity to the end user from the first electrical network and from the public utility electrical network, wherein:
a switch at all times electrically isolates the first electrical network from the public utility electrical network;
the end user is a first end user; and
the first electrical network further comprises:
a third conductive path electrically coupling at least some of the first electricity producing elements to second electrical wiring of a second end user, and
a controller electrically coupled to the first electricity producing elements and to the first conductive path and the third conductive path, wherein the controller is configured to specify a voltage and a frequency of electricity delivered to the first end user and the second end user from the first electricity producing elements, wherein the specified frequency and voltage of the electricity delivered to the first end user is the same as the specified frequency and voltage of the electricity delivered to the second end user even when the first end user and the second end user place different loads on the first electricity producing elements.

12. The system of claim 11, wherein an electrical meter is coupled between the second conductive path and the electrical wiring of the first end user and no electrical meter is coupled between the first conductive path and the electrical wiring of the first end user.

13. The system of claim 11, wherein the one or more first electricity producing elements comprise one or more solar panels.

14. The system of claim 11, wherein the first electrical network is operated by a first entity other than the first end user and the second end user, and the public utility electrical network is operated by a second entity other than the first entity and the first end user and the second end user.

15. A method comprising:
    determining, in association with a switch coupled between a first conductive path of a first electrical network and electrical wiring of an end user and between a second conductive path of a public utility electrical network and the electrical wiring of the end user, whether an amount of electricity used by the end user exceeds an amount of electricity the first electrical network is capable of providing to the end user;
    in response to a determination that the amount of electricity used by the end user does not exceed the amount of electricity the first electrical network is capable of providing to the end user, drawing, through the switch, electricity to the end user only from first electrical network; and
    in response to a determination that the amount of electricity used by the end user exceeds the amount of electricity the first electrical network is capable of providing to the end user, drawing, through the switch, electricity to the end user from the first electrical network and from the public utility electrical network, wherein:
    the switch at all times electrically isolates the first electrical network from the public utility electrical network;
    the end user is a first end user; and
    the first electrical network further comprises:
        a third conductive path electrically coupling at least some of the first electricity producing elements to second electrical wiring of a second end user, and
        a controller electrically coupled to the first electricity producing elements and to the first conductive path and the third conductive path, wherein the controller is configured to specify a voltage and a frequency of electricity delivered to the first end user and the second end user from the first electricity producing elements, wherein the specified frequency and voltage of the electricity delivered to the first end user is the same as the specified frequency and voltage of the electricity delivered to the second end user even when the first end user and the second end user place different loads on the first electricity producing elements.

16. The method of claim 15, wherein an electrical meter is coupled between the second conductive path and the electrical wiring of the first end user and no electrical meter is coupled between the first conductive path and the electrical wiring of the first end user.

17. The system of claim 11, wherein the specified voltage is approximately 480 volts and the specified frequency is approximately 60 Hz.

18. The system of claim 11, wherein the specified voltage is approximately 480 volts and the specified frequency is approximately 60 Hz.

19. The method of claim 15, wherein the specified voltage is approximately 480 volts and the specified frequency is approximately 60 Hz.

20. The system of claim 11, wherein the controller is further configured to:
    determine a first electricity demand by the first end user and a second electricity demand by the second end user;
    allocate, based at least in part on the first demand, a first amount of electricity from the first electricity producing elements to the first end user; and
    allocate, based at least in part on the second demand, a second amount of electricity from the first electricity producing elements to the second end user.

21. The system of claim 11, wherein the first electrical network further comprises one or more electrical storage elements electrically coupled to the first conductive path.

22. The system of claim 11, wherein the first electricity producing elements are capable of providing the majority of an amount of electricity used by the first end user and the second end user.

23. The system of claim 11, wherein:
    the first electrical network is configured to transmit electrical current over the first conductive path using a voltage of not more than 480 volts; and
    the public-utility electrical network is configured to transmit electrical current over at least part of the second conductive path using a voltage of at least 50 kilovolts.

24. The system of claim 14, wherein the second entity is a public utility.

25. The method of claim 15, wherein the controller is further configured to:
    determine a first electricity demand by the first end user and a second electricity demand by the second end user;
    allocate, based at least in part on the first demand, a first amount of electricity from the first electricity producing elements to the first end user; and
    allocate, based at least in part on the second demand, a second amount of electricity from the first electricity producing elements to the second end user.

26. The method of claim 15, wherein the first electrical network further comprises one or more electrical storage elements electrically coupled to the first conductive path.

27. The method of claim 15, wherein the first electricity producing elements are capable of providing the majority of an amount of electricity used by the first end user and the second end user.

28. The method of claim 15, wherein:
    the first electrical network is configured to transmit electrical current over the first conductive path using a voltage of not more than 480 volts; and
    the public-utility electrical network is configured to transmit electrical current over at least part of the second conductive path using a voltage of at least 50 kilovolts.

29. The method of claim 15, wherein the first electrical network is operated by a first entity other than the first end user and the second end user, and the public utility electrical network is operated by a second entity other than the first entity and the first end user and the second end user.

30. The method of claim 29, wherein the second entity is a public utility.

* * * * *